United States Patent [19]

Kaehler

[11] Patent Number: 5,798,931

[45] Date of Patent: Aug. 25, 1998

[54] FUEL DISPENSER/OPERATOR INTERCOM SYSTEM

[75] Inventor: David L. Kaehler, Greensboro, N.C.

[73] Assignee: Gilbarco Inc., Greensboro, N.C.

[21] Appl. No.: 659,304

[22] Filed: Jun. 6, 1996

Related U.S. Application Data

[60] Provisional application No. 60/000,217, Jun. 14, 1995.
[51] Int. Cl.[6] .............................. G06F 17/00; G06G 7/48
[52] U.S. Cl. ................................................... 364/479.01
[58] Field of Search ........................ 364/479.01; 186/36; 340/149; 358/93; 455/53.1, 66; 379/53

[56] References Cited

U.S. PATENT DOCUMENTS

| | | | |
|---|---|---|---|
| 3,774,723 | 11/1973 | Johnston | 186/1 C |
| 3,786,421 | 1/1974 | Wostl et al. | 340/149 |
| 4,111,282 | 9/1978 | Vayda, Jr. | 186/1 C |
| 4,169,521 | 10/1979 | Vayda, Jr. | 186/1 C |
| 4,189,031 | 2/1980 | Vayda, Jr. | 186/1 |
| 4,395,627 | 7/1983 | Barker et al. | 235/381 |
| 4,589,069 | 5/1986 | Endo et al. | 364/405 |
| 4,805,738 | 2/1989 | Vayda | 186/36 |
| 4,884,662 | 12/1989 | Cho et al. | 186/36 |
| 5,053,868 | 10/1991 | Higgins et al. | 358/93 |
| 5,113,974 | 5/1992 | Vayda | 186/36 |
| 5,114,050 | 5/1992 | Morris | 222/192 |
| 5,134,716 | 7/1992 | Craig | 455/66 |
| 5,164,980 | 11/1992 | Bush et al. | 379/53 |
| 5,168,354 | 12/1992 | Martinez et al. | 358/93 |
| 5,220,677 | 6/1993 | Brooks | 455/53.1 |
| 5,321,848 | 6/1994 | Miyahira et al. | 455/66 |
| 5,482,139 | 1/1996 | Rivalto | 186/36 |
| 5,557,268 | 9/1996 | Hughes et al. | 340/933 |
| 5,585,858 | 12/1996 | Harper et al. | 348/485 |

FOREIGN PATENT DOCUMENTS

| | | |
|---|---|---|
| 2 222 714 | 3/1990 | United Kingdom . |
| WO 93/00575 | 8/1981 | WIPO . |
| WO 89/07807 | of 1988 | WIPO . |
| WO 89/09318 | of 1988 | WIPO . |
| WO 89/07807 | 2/1989 | WIPO . |
| WO 89/09318 | 3/1989 | WIPO . |
| WO 96/28791 | 3/1995 | WIPO . |
| WO 96/28791 | 9/1996 | WIPO . |

Primary Examiner—Reba I. Elmore
Assistant Examiner—Monica Lewis
Attorney, Agent, or Firm—Rhodes Coats & Bennett, L.L.P.

[57] ABSTRACT

An apparatus for installation in a retail setting for selling fuel and other products ordered by a customer interacting with an operator. A video control system interfaces an external audio/video signal source with an audio/video signal source from an other product ordering apparatus operator. The external audio/video source transmits advertising and promotional materials to a video display located on a card reader equipped fuel dispenser. Additionally, customers can signal and communicate through audio/video signals with the operator to order other merchandise. Total transaction costs for fuel and non-fuel products is provided and paid for at the fuel dispenser.

40 Claims, 5 Drawing Sheets

FUEL DISPENSER/OPERATOR INTERCOM SYSTEM

BACKGROUND OF THE INVENTION

The present invention relates to an apparatus for installation in a retail setting for selling fuel and other non-fuel products. This apparatus allows a customer to place his or her order by interacting with an operator. The apparatus allows the customer, when pumping fuel into his vehicle, to consider and decide to purchase one or more of the available items presented to the customer over a video display screen and menu item board located on the fuel dispenser housing. The apparatus provides a video display capability which can interface with both an external audio-video signal source and a video image of the attendant. Thus, the apparatus may combine external advertising and promotional capabilities with the added personal interaction associated with operator attended drive-through service/product transactions.

Also, the present invention has the added ability to combine the total transaction cost from the fuel and non-fuel sales, present the finalized cost to a customer at the fuel dispenser, and allow payment at the fuel dispenser itself. This invention permits the customer to initiate and complete an extended transaction from one location, yielding added convenience to the customer. Likewise, the invention offers enhanced marketing and sales without hindering the fuel service traffic flow.

Current fuel dispenser video display systems lack the ability to merge recorded advertising promotions with real time audio/video communication to a sales operator. Additionally, current systems do not provide the added convenience of finalizing fuel and non-fuel transaction in one location.

The present invention includes both functions. While the customer is pumping gas, the customer is presented with both a menu item board and a video display of other items available for purchase. Meanwhile, a site controller authorizes payment and tracks the quantity and cost of the fuel dispensed. To purchase additional items the customer can interact with a live operator through a signalling device located on the fuel dispenser housing. The operator's response halts the external advertising and promotional display and presents in its place a real time video image of the operator or an optional video/graphic message supportive of the ordering function along with audio communication. In this manner the customer can communicate his or her order and, additionally, receive audio/visual confirmation of the request. At the conclusion of the sale, a single cost total is similarly presented on the video display of the fuel dispenser. Additionally, the customer is provided with a printed receipt to pick up his or her order at a delivery window and may chose between credit, debit or cash payment means located on the fuel dispenser housing.

Prior efforts to enhance fuel station retail capabilities and simplify consumer fuel dispenser use and payment method have not achieved the combined capabilities of the present invention. In particular, none of the related prior art interfaces offer external audio/video advertising signals with direct audio/video contact to a store attendant.

Also, none of these previous attempts have achieved the combined utility of interfacing separate advertising and operator audio/video signals with a simplified method of purchasing both fuel and non-fuel products in a single transaction.

SUMMARY OF THE INVENTION

The present invention fulfills this need in the art by providing an apparatus in a retail setting for selling fuel and other non-fuel products. This apparatus allows a customer to place his or her order by interacting with an operator. In the apparatus a fuel dispenser housing, other product ordering apparatus, a site controller, and an external audio/visual signal source are all connected via wiring.

The fuel dispenser housing includes a fuel dispensing and measuring apparatus, a video display for displaying information to the customer, a first microphone to capture the voice of the customer, a first speaker to reproduce the voice of the operator, a signalling device actuable to permit the customer to signal to the operator that the customer wishes to place an order for other non-fuel products, and a payment receiver for receiving payment from the customer.

In a preferred embodiment, the fuel dispenser is a CRIND™ fuel dispenser with the InfoScreen™ Video Display (both of which are sold by Gilbarco Inc. of Greensboro, N.C.), is optionally equipped with a payment receiver which accepts cash, debit and credit cards, includes a menu item board adopted for displaying fast food options to customers, and also includes a printer to print a receipt for the customer to use to claim the other products ordered during a transaction.

Similarly, the other product ordering apparatus further includes a data terminal for receiving operator-keyed data about additional products ordered by a customer, a camera to be oriented to capture an image of the operator during a transaction and linked electronically to the video display in the fuel dispenser, a second microphone to be positioned to capture the voice of the operator during a transaction and linked to the first speaker in the fuel dispenser, a second speaker linked to the first microphone in the fuel dispenser to reproduce the voice of the customer during a transaction, an indicator linked to the signalling device to indicate to the operator that the customer wishes to order other products, and a video control system linked to the video display to control video images displayed on the video display.

In one embodiment the second microphone and second speaker are separately contained and freestanding. In a preferred embodiment the second microphone and speaker are contained in a headset to be worn by the operator of the product ordering apparatus. Additionally, in the preferred embodiment the data terminal is a computer system for a fast food operation.

The external audio/video signal, carrying advertising and promotional information, may serve as the primary signal display on the fuel dispenser's display screen. Preferably, a single external audio/video signal source is configured to connect with a plurality of fuel dispensers.

Similarly, the other product ordering apparatus is configured to communicate with a plurality of fuel dispensers. When a customer actuates the signalling device, the indicator in the other product ordering apparatus alerts the product ordering apparatus operator that a customer wishes to place an order and additionally identifies which fuel dispenser is signalling. The other product ordering apparatus includes a fuel dispenser selector as part of the video control system. The fuel dispenser selector gives the operator of the product ordering apparatus control over which audio/video signal is presented to the customer on the fuel dispenser's video screen display.

In a preferred embodiment the operator is alerted to the customer's signal by an audio/visual indicator. Additionally, in a preferred embodiment the fuel dispenser includes a message store to display a message on the video display immediately after the customer signals and before the operator such as "please wait, we'll be right with you".

The video control system of the other product ordering apparatus may include an interface mechanism to select which audio/video signal a given fuel dispenser's display screen receives. The interface mechanism may include a digitally triggered video multiplexor assigned to each fuel dispenser. Each video multiplexor has a first input adapted for receiving signals from the data terminal camera, or a second video source such as a video of the manager's specials for the day, a microphone, and data terminal of the other product ordering apparatus, a second input adapted for receiving signals from the external audio/visual signal source, and a digital logic dependent output adapted for carrying the chosen signal via twisted pair wiring to the CRIND fuel dispensers. The apparatus for the twisted pair wiring is described in U.S. patent application Ser. No. 08/237,148 filed May 3, 1994, entitled "AUDIO AND VIDEO TRANSMISSION FROM A FUEL STATION STORE TO A FUEL PUMP COMMUNICATION UNIT," the entire disclosure of which is incorporated herein by reference. The video control system further includes an operator selection device having a keypad adapted for outputting a selection signal to trigger which CRIND fuel dispenser will receive audio and video signals from the other product ordering apparatus, a line encoder connected to the operator selection device adapted for receiving and converting the selection signal to a four bit BCD code word, and a line decoder connected to the line encoder and the plurality of digitally triggered video multiplexors adapted for serving as the digital control interface between the operator selection device and the plurality of digitally triggered video multiplexors.

In one embodiment the other product ordering apparatus further includes a video graphics mixer connected to the camera and to the order-entry data terminal adapted for receiving graphic information from the order-entry data terminal and superimposing the graphics on the video transmission from the camera. Likewise, an audio/video mixer is included and connected to the microphone and to the audio/graphics mixer to further combine signals. Also, the video multiplexors each include an inverter to ensure only one of the fuel dispensers at a time is served by the audio/video signal from the other product ordering apparatus. This later signal includes the video image of the operator, the voice of the operator, and graphic video information relating to the other product transaction.

The other product ordering apparatus may communicate the transaction details and the cost total of non-fuel products to the central control and the central control may total the non-fuel and fuel products costs and relay that cost amount total to the video display screen located on the fuel dispenser housing for presentation to the customer.

The invention also provides a method for arranging for sale and payment for fuel and other products in a single transaction. The first step is to provide a fuel dispenser housing having fuel dispensing and measuring apparatus, a video display for displaying information to the customer, a first microphone to capture the voice of the customer, a first speaker to reproduce the voice of the operator, a signalling device actuable to permit the customer to signal to the operator that the customer wishes to place an order for other products, and a payment receiver for receiving payment from the customer. The customer dispenses fuel through the fuel dispensing and measuring apparatus. A central controller authorizes credit for the customer, and the dispenser tracks the quantity and cost of the fuel dispensed. While this activity is occurring, other advertising and promotional information is displayed to the customer over the fuel dispenser's video display screen. A customer who wishes to order other non-fuel products signals the store operator from a signalling device located at the fuel dispenser. Once the customer has signaled, the operator can respond to the signal and invite the customer to place an order for other products by speaking into a microphone which reproduces the operator's voice over the speaker located in the fuel dispenser housing. Optionally, a video image of the operator is transmitted from a video camera at the operator's location and appears on the fuel dispenser's video display screen.

In the preferred embodiment the customer's order request signal is indicated by an audio/video indicator at the operator's location and the method includes displaying a message from a message store on the video display immediately after the customer signals and before the operator responds. The method may include selecting from among the signalling fuel dispensers and switching the video display on that dispenser's display from the external audio/video signal source to the audio/video signal originating from the camera, microphone, and data terminal of the other product ordering apparatus.

The method includes receiving the customer's request and entering the order data into the data entry computer. The method may include communicating the order data back to the customer for confirmation. This may include an audio and visual confirmation of the order data on video graphics from the operator's data entry terminal superimposed over the video image of the operator and displayed on the fuel dispenser's video display screen.

Upon confirmation, the non-fuel order entry data including its cost is transmitted to the site controller, where the data is compiled with the fuel transaction cost. Next, the invention provides that the compiled transaction is transmitted from the site controller to the fuel dispenser housing and displayed on a video display screen to the customer. A printer in the dispenser housing prints out a claim document for the customer to use to claim the non-fuel products ordered during the transaction. Finally, the customer takes the claim document to a non-fuel product delivery window, presents the document, and receives the additional ordered merchandise.

In one embodiment of the method, the customer may pay for the fuel and non-fuel transaction at the delivery window. In another embodiment of the method, the customer is invited to pay through a cash receiver located in the fuel dispenser housing. In another embodiment, payment is received by adding the charge for the non-fuel items to the amount being debited for the fuel sales against the customer's card account by a card reader facility located on the fuel dispenser housing.

BRIEF DESCRIPTION OF THE DRAWINGS

The invention will be better understood after a reading of the Detailed Description of the Preferred Embodiments and a review of the drawings in which.

DETAILED DESCRIPTION OF THE PREFERRED EMBODIMENTS

Figure 1:
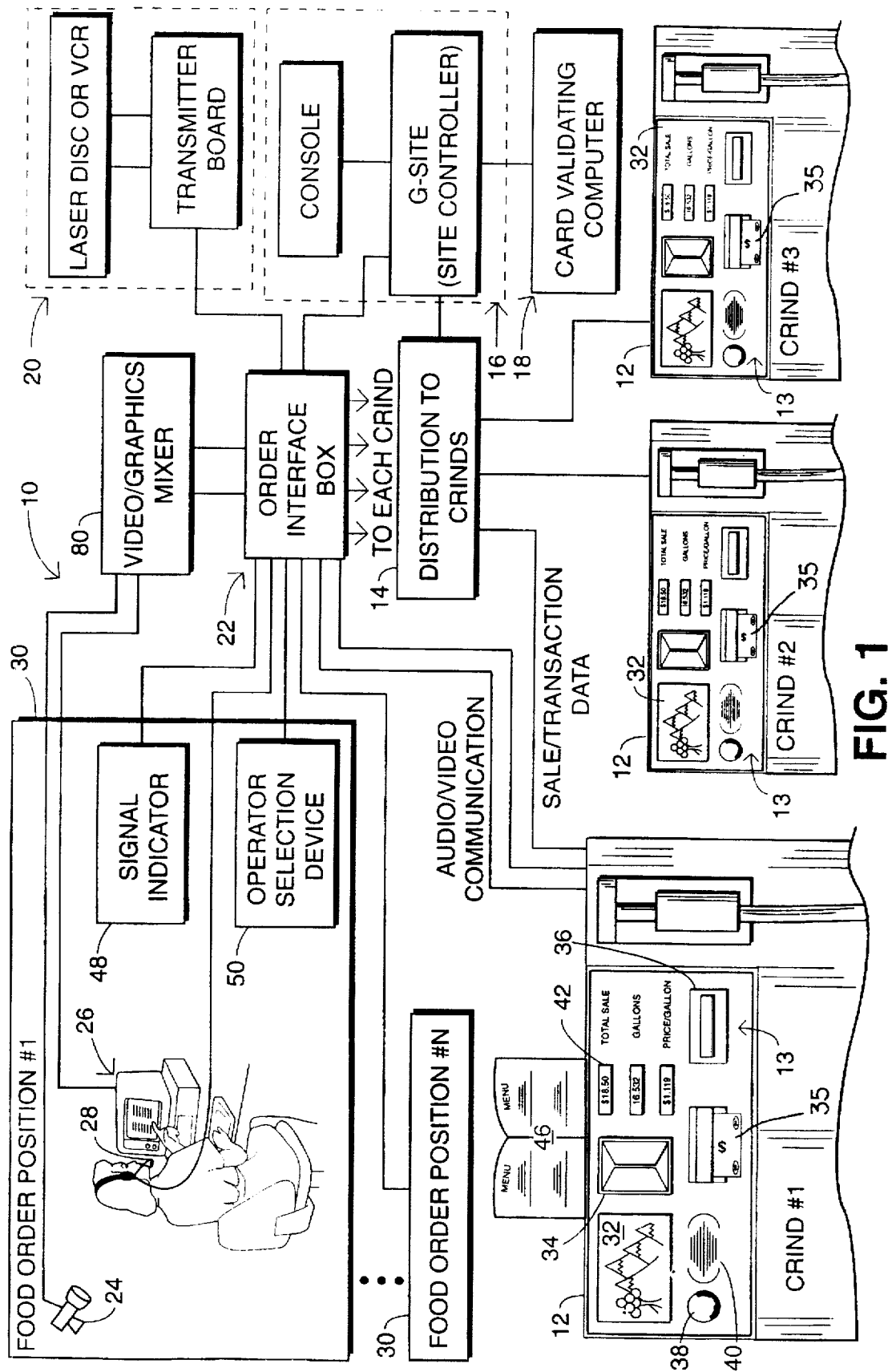
FIG. 1 is a block diagram of a service station illustrating major components of a preferred embodiment according to the present invention as linked together.

Referring now to the drawings in general and FIG. 1 in particular, it will be understood that the illustrations are for the purpose of describing a preferred embodiment of the invention and are not intended to limit the invention thereto. As seen in FIG. 1, a service station 10 has on site a plurality of card-reader-equipped fuel dispensers 12 connected through a single distribution box 14 to a site controller 16. The card-reader equipped fuel dispensers are preferably CRIND dispensers sold by Gilbarco Inc. of Greensboro, N.C. Similarly, the site controller 16 is preferably the G-SITE ™ system controller sold by Gilbarco Inc. of Greensboro, N.C. The controller 16 serves as an overall system controller for the multiplicity of CRIND fuel dispensers 12. It has a link to a remote credit or debit card validating computer 18, such as a telephone link.

The dispensers 12, distribution box 14, controller 16, and computer 18 are connected electronically. Additionally, their configuration and relationship is conventional in terms of card validation function.

Each of the dispensers 12 is supplied with a primary audio/video signal from a primary audio/video signal source 20 through an order interface box 22 and connected wiring. Preferably, the wiring connecting components of the system in noise-prone areas is twisted pair wiring. This single external audio/video signal source 20 serves as a primary video signal for the plurality of fuel dispensers 12. The signal source may include a transmitter board or other transmission device to aid transmission of the video signals to the order interface box 22. The external audio/video source may be any conventional device such as a video cassette recorder or a laser disc player. An example of an apparatus for displaying the video signal is described in U.S. patent application Ser. No. 08/539,505, filed Oct. 6, 1995, a continuation of the now abandoned U.S. patent application Ser. No. 07/960,512 filed Oct. 13, 1992, entitled "Multimedia Video/Graphics in Fuel Dispensers", the entire disclosure of which is incorporated herein by reference.

Similarly, each of the dispensers 12 is configured to receive an audio/visual signal from an alternative audio/video source 30 preferably in the form of a non-fuel or other product ordering apparatus. As shown is FIG. 1, the alternative audio/video signal source 30 includes a camera 24, a data entry terminal 26, and a microphone/speaker combination 28 of the type which are readily available as commercial headsets. The signal from the alternative audio/video signal source 30 likewise passes through the order interface box 22 and is connected to the fuel dispensers 12, preferably by twisted pair wiring. There may be a plurality of alternative audio/video signal sources 30 similarly configured as noted in block form in FIG. 1. The camera 24 may be any conventional camera and the data entry terminal 26 may be any of the type commercially available, but preferably is of the type conventionally used in the fast food service industry.

FIG. 1 depicts the face 13 of one of the card-reader-equipped fuel dispensers 12 showing a video display 32, a magnetic stripe card reader 34, a receipt/claim document printer 36, an actuable signalling device 38, a speaker/microphone 40, a menu item board 46, and a display 42 to present fuel dispensing data. If desired the displays 32 and 42 may be merged onto a single screen, as disclosed in copending U.S. patent application Ser. No. 08/459,662 filed Jun. 2, 1995, entitled "Transaction Display on Video/Graphics in Fuel Dispensers," the entire disclosure of which is incorporated herein by reference. Also, the fuel dispenser 12 is equipped with a measuring apparatus, not shown, which tracks the quantity of fuel being dispensed. The dispensed fuel data is communicated electronically, preferably over twisted pair wiring, to the site controller 16 as is conventional in products such as the Gilbarco line of CRIND dispensers 12 sold under the trademark THE ADVANTAGE®.

Thus, when a customer begins pumping fuel at a CRIND fuel dispenser the measuring apparatus communicates that fact to the site controller 16 over twisted pair wiring. Simultaneously, the primary external audio/video signal source 20 transmits advertising and promotional information through the order interface box 22 and on to the video display 32. The transmitted messages may entice the customer to order other products, including those itemized on a menu item board 46 found on the fuel dispenser 12. The menu item board may be incorporated on the video display 32 by interactive or other graphical menu displays. If the customer chooses to order other, non-fuel products, the customer signals the other product ordering apparatus operator located at the data entry terminal 26, by actuating the signalling device 38. The signalling device alerts the central control computer 16 through the CRIND facility. Additionally, actuating the signalling device calls up a message display, such as "please wait," from a video storage in the fuel dispenser 12 or elsewhere in the service station. Next, the central controller 16 forwards the request to the other product ordering apparatus operator over twisted pair wiring through the order interface 22 box and on to a signal indicator 48, which may be presented on a remote display, such as the data entry terminal 26 at the other product ordering apparatus 30. The signalling device 38 may be incorporated with the video display 32 with touch-screen technology.

Figure 2:
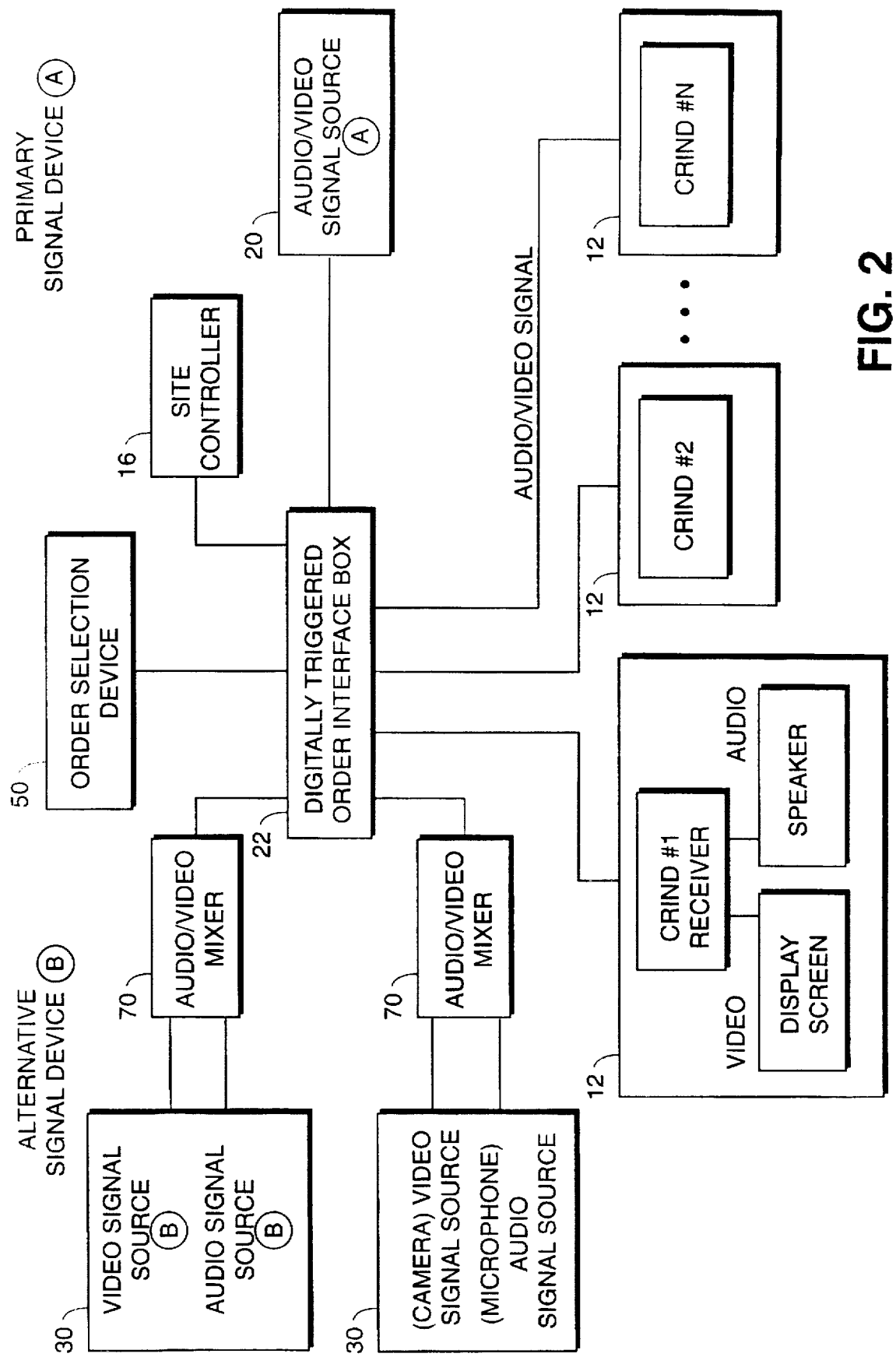
FIG. 2 is a block diagram providing a simplified view of the input and output at the order interface box of FIG. 1.
Figure 3:
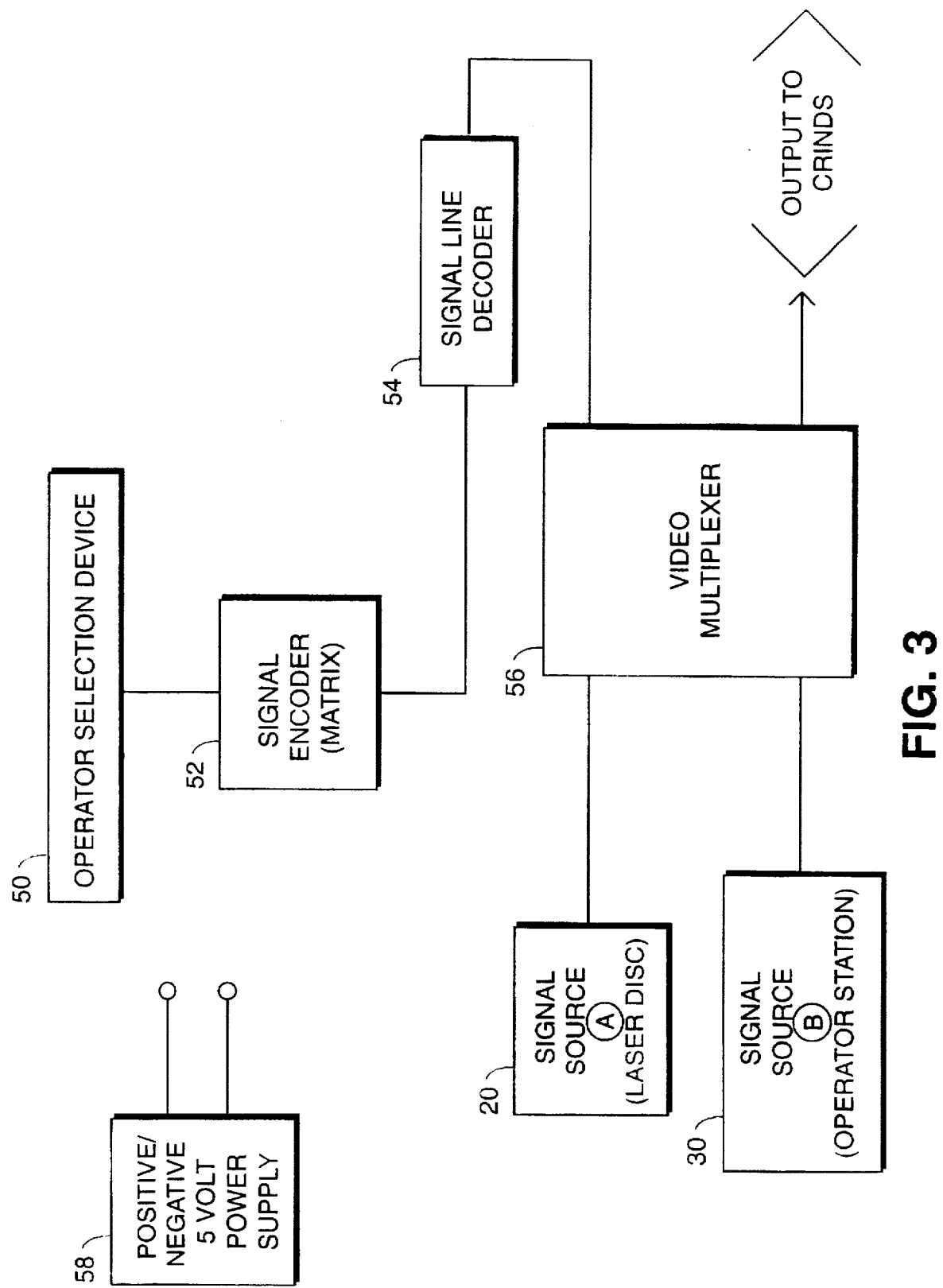
FIG. 3 is a block diagram illustrating the major components of the digitally controlled order interface box as linked together.

As shown in FIGS. 1, 2 & 3, the operator has a selection device 50 which allows the operator to respond to a customer signalling from a fuel dispenser 12. The operator depresses a key on the selection device keypad 50 corresponding to that fuel dispenser 12 from which a customer has signalled.

Figure 4A:
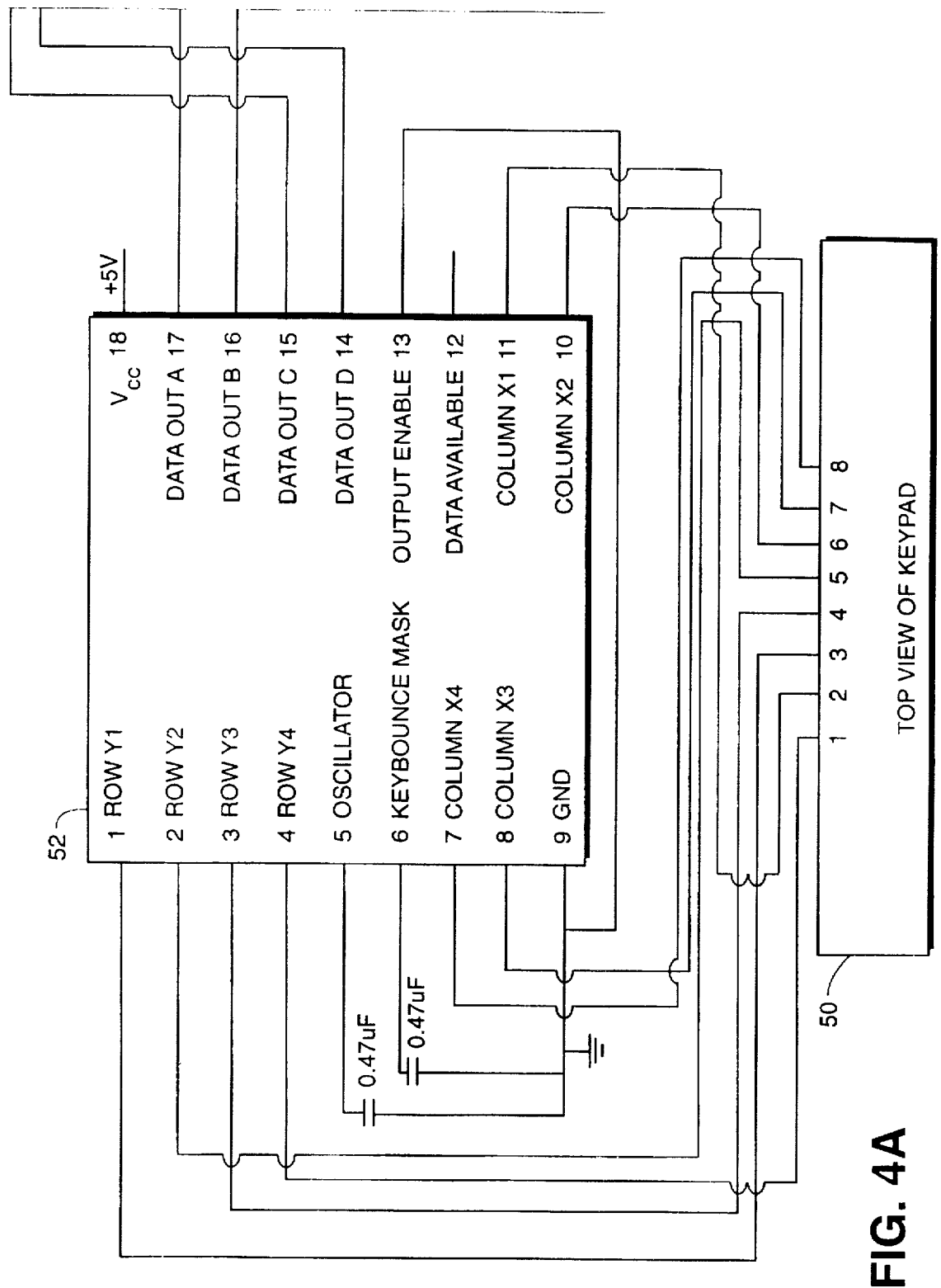
FIG. 4A is a schematic rendering of the various components of the electronics used in a order interface box in a preferred embodiment.
Figure 4B:
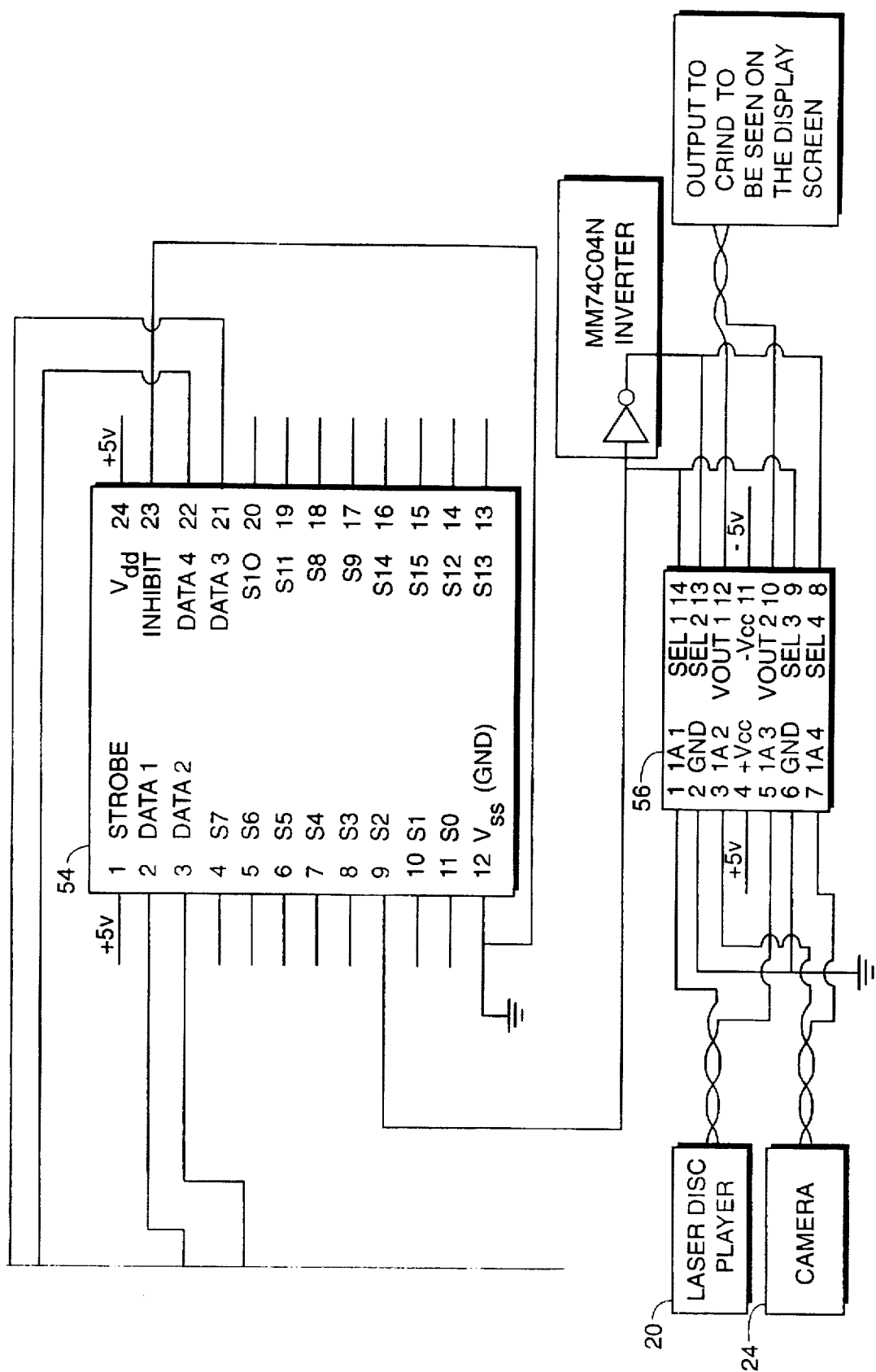
FIG. 4B is a schematic rendering of the various components of the electronics used in a order interface box in a preferred embodiment.

As shown in FIG. 4A, a preferred selection device keypad is a SLP120A16-10 Matrix Keypad, having 16 buttons, each connected internally in a 4×16 matrix design. The selection device keypad is powered by a conventional positive/negative 5 volt power supply 58 as shown in FIG. 3. Depression of a key sends a signal to a MM47C922J Encoder 52 which converts the signal into a four bit BCD code word. The code word is an input at a MC14514BCP 4 to 16 Signal Line Decoder 54 as shown in FIG. 4B. The line decoder serves as a digital control interface between the user selection device 50 and a MPC102AP 2 to 1 Video Multiplexor 56. The video multiplexor 56 receives analog input signals from both the primary and alternative signal sources 20 and 30. The video multiplexor 56 is configured such that the primary, external audio/video signal source 20 is output across twisted pair wiring to all of the fuel dispensers 12. In the present invention, one video multiplexor 56 is required for each fuel dispenser 12. In this configuration, the operator selects one order request signal at a time to respond to. The selection signal sent by the operator switches the digital logic on the video multiplexor 56 blocking the first signal source 20 and allowing the alternative audio/video signal from the other product ordering apparatus 30 to pass through. Additionally, the video multiplexor 56 is connected to a MM74C04N CMOS Inverter to ensure only one fuel dispenser at a time is served by the audio/video signal from the other product ordering apparatus 30.

A customer places his or her order for other products by speaking into the speaker/microphone 40 on the fuel dispenser housing 12. The audio signal is transmitted via twisted pair wiring through the order interface box 22 and is reproduced over the speaker found in the operator's headset. Order data is logged into the data entry terminal 26 which computes the other product cost information. The cost data from the other product order is transmitted to the central controller 16 through the order interface box 22.

The other product ordering apparatus 30 provides for audio/video order confirmation. An audio/video mixer 70 couples audio/video communication transmitted from the operator station 30 to the customer as shown in FIG. 2. This may be done as taught in pending U.S. patent application Ser. No. 08/237,148, the entire disclosure of which is incorporated herein by reference. In one embodiment, the order data displayed graphically on the operator's data entry terminal 26 is transmitted to a video/graphics mixer 80, shown in FIG. 1. The video/graphics mixer 80 superimposes or overlays digital data from the terminal 26 as graphics on the video image input from the camera 24. The combined video/graphics signal is sent via twisted pair wiring through the order interface box 22 to the video display 32 on the fuel dispenser 12.

Alternatively, the video image with the superimposed graphics may be constructed at dispenser 12 if the video/graphics mixer 80 is located at the dispenser 12. The order data is relayed from the other product ordering apparatus through the controller 16 to the video/graphics mixer 80 in the dispenser 12. The video/graphics mixer 80 will then assimilate the graphic image displayed from the order data and the image input from the camera 24 or video player 20. Preferably, the superimposed graphic image provides a graphic receipt which is updated for each line item entry. The video/graphics mixer 80 will update the graphic line by line during the transaction for the customer to view the receipt throughout the ordering process.

A completed transaction includes completion of the other product order and fuel dispensing. The total cost information is processed in the central controller 16 and transmitted via twisted pair wiring to the display 42 on the fuel dispenser 12. The printer 36 in the fuel dispenser 12 prints a receipt for the customer which enables the customer to claim non-fuel products at a delivery window.

Payment for the above transaction is received by adding the charges for the non-fuel items to the amount being debited for the fuel sale against the customer's card account by the card reader equipment 34 on the fuel dispenser 12. Alternatively cash may be inserted into the cash acceptor 35 located on the face 13 of the fuel dispenser.

Certain modifications and improvements will occur to those skilled in the art upon a reading of the foregoing description. It should be understood that all such modifications and improvements have been deleted herein for the sake of conciseness and readability but are properly within the scope of the following claims.

What is claimed is:

1. An apparatus for installation in a retail setting for selling fuel and other products ordered by a customer interacting with an operator, comprising:

a. at least two fuel positions for dispensing fuel, each said position having:

i. a video display for displaying information to the customer, ii. a first microphone to capture the voice of the customer, iii. a first speaker to reproduce the voice of the operator, iv. a signaling device actuable to permit the customer to signal to the operator that the customer wishes to place an order for fast food items by interfacing with an operator, v. a payment receiver for receiving payment from the customer, and vi. a menu for displaying fast food items to customers, vii. each said position configured to provide a complete fuel transaction at said position without operator intervention when fast food items are not ordered, b. a fast food ordering apparatus located apart from said fueling positions at an operators' work station including:

i. an order-entry data terminal for receiving operator-keyed data about products ordered by a customer from any one of said positions of said fuel dispenser, ii. a video control system including, video switching circuitry having first and second inputs, said video control system further including a digital logic dependent output adapted for carrying the chosen signal to a selected position of said fuel dispenser, an operator selection device having input adapted for outputting a selection signal to trigger which said fueling position will receive audio and video signals from said fast food ordering apparatus, and logic circuitry connected to said video switching circuitry to ensure only one of said video displays, located at one said position, is served by the audio and visual signals of said fast food ordering apparatus at one time, iii. a camera at said data terminal and connected to said video control system at said first input, iv. a second microphone positioned to capture the voice of the operator during a transaction and connected to said video control system at said second input, v. a second speaker connected to said first microphone in said fuel dispenser to reproduce the voice of the customer during a transaction, and vi. an indicator at said operator's workstation adapted for receiving the signal from said signaling device at fueling position and for identifying from which fueling position the signal originates, c. a fuel dispensing and payment receiving processing site controller linked to said fueling positions and to said fast food ordering apparatus to receive cost information, said fuel dispensing and payment receiving processing site controller adapted to receive cost information concerning the products ordered by the customer, including total sale cost information, to said fueling position for dislay on said video display so that the customer may pay for the products and fuel in the same transaction through said payment receiver; and d. wherein each said fueling position is configured to provide audio and video of the operator to place a fast food item order when said signaling device is activated in addition to carrying out a fueling transaction.

2. The apparatus of claim 1 wherein said site controller computes a running total of line items as they are ordered and transmits the total to the appropriate video display for display with the line items.

3. The apparatus of claim 2 wherein said fuel dispenser housing includes a computation device that computes a running total of the line items as they are ordered and transmits the total to the appropriate video display for display with the line items.

4. An apparatus for installation in a retail setting for selling fuel and fast food items ordered by a customer interacting with an operator, comprising:
 a. a fuel dispenser housing including:
  i. fuel dispensing and measuring apparatus,
  ii. a video display for displaying information to the customer,
  iii. a first microphone to capture the voice of the customer,
  iv. a first speaker to reproduce the voice of the operator,
  v. a signalling device actuable to permit the customer to signal to the operator that the customer wishes to place an order for fast food items by interfacing with an operator, and
  vi. a customer interface configured to provide a complete fuel transaction at said housing without operator intervention when fast food items are not ordered,
 b. a fast food ordering apparatus located apart from said housing including:
  i. a data terminal for receiving operator-keyed data about products ordered by a customer at said housing,
  ii. a camera to be oriented to capture an image of the operator during a transaction and linked to the video display in the fuel dispenser,
  iii. a second microphone to be positioned to capture the voice of the operator during a transaction and linked to the first speaker in the fuel dispenser,
  iv. a second speaker linked to the first microphone in the fuel dispenser to reproduce the voice of the customer during a transaction,
  v. an indicator linked to the signalling device to indicate to the operator that the customer wishes to order other products, and
  vi. a video control system linked to the video display to control video images displayed on the video display, and
 c. a site controller linked to the fuel dispenser and to the fast food ordering apparatus to receive cost information concerning fast food ordered by the customer and communicating received cost information to said fuel dispenser so that the customer may pay for other products as well as dispensed fuel,
 wherein said apparatus is configured to provide audio and video of the operator at the video display to place a fast food item order when said signalling device is activated in addition to carrying out a fueling transaction.

5. An apparatus as claimed in claim 4 further comprising a video signal source linked to said video display for displaying a video signal on said display prior to the customer's actuation of the signalling device.

6. An apparatus as claimed in claim 4 wherein said data terminal is computer system for a fast-food operation.

7. An apparatus as claimed in claim 4 wherein said fuel dispenser further comprises a printer to print a claim document for the customer to use to claim the other products ordered during a transaction.

8. An apparatus as claimed in claim 4 further comprising a primary video signal source and wherein said fuel dispenser is linked to said primary video signal source and said video display displays a video from said primary video signal source prior to a customer's actuation of said signalling device.

9. An apparatus as claimed in claim 4 wherein said fuel dispenser further comprises an indication of other products available by actuation of said signalling device.

10. An apparatus as claimed in claim 4 wherein said indicator provides an audible indication and a visible indication.

11. An apparatus as claimed in claim 4 wherein said fuel dispenser further comprises a message store to display a message on said video display after a customer actuates said signalling device and before the operator responds to said indicator.

12. An apparatus as claimed in claim 4 wherein said other product ordering apparatus further comprises a headset to be worn by the operator and wherein said second microphone and said second speaker are mounted in said headset.

13. An apparatus as claimed in claim 4 wherein said video control system includes a video image store of depictions of other products available for purchase and displays depictions of ordered items as entered by the operator in said data terminal.

14. An apparatus as claimed in claim 4, wherein:
 there are a plurality of said fuel dispensers associated with a single other product ordering apparatus,
 said indicator indicates as an active dispenser the one from which the customer is signalling,
 said other product ordering apparatus further comprises a dispenser selector to direct the image and voice of the operator to be displayed on the video display and reproduced by the first speaker of the active dispenser, and
 said video control system controls the video display of the active dispenser.

15. A dispenser selector as claimed in claim 14 further including a graphics and video interface to superimpose graphically the order data keyed into said data terminal over the image and voice of the operator to be displayed on said video display and reproduced by said first speaker of the active dispenser.

16. An apparatus as claimed in claim 4 further comprising a payment receiver for receiving payment from a customer.

17. An apparatus as claimed in claim 16 wherein said payment receiver is a card reader.

18. An apparatus as claimed in claim 16 wherein said payment receiver is a cash acceptor.

19. A method of arranging for sale and payment for fuel and fast food products in a single transaction, comprising the steps of:
 providing a fuel dispenser housing having fuel dispensing and measuring apparatus, a video display for displaying information to the customer, a first microphone to capture the voice of the customer, a first speaker to reproduce the voice of the operator, a camera to provide video of a fast food operator on the video display when fast food ordering is initiated, a signalling device actuable to permit the customer to signal to the operator that the customer wishes to place an order for other products, and a payment receiver for receiving payment from the customer;
 dispensing fuel through the fuel dispensing and measuring apparatus;
 monitoring the cost of fuel dispensed;
 signalling a store operator from a signalling device located at the fuel dispenser when fast food ordering is desired;
 responding to the signal from the signalling device by the video display and the first speaker;
 transmitting product order data requested by the customer from the first microphone to a fast food ordering location;

registering the order data received from the customer on an order-entry data terminal;

transmitting product order cost data from the remote product ordering location to the video display of the fuel dispenser; and receiving payment for the fuel and fast food from the customer through the payment receiver.

20. The method of claim 19 wherein said step of dispensing is performed through a card-reader equipped fuel dispenser and further comprising reading data on card inserted in the card reader.

21. The method of claim 19 further including the step of displaying other advertising and promotional information on the video display by transmitting a video image from an external audio/visual signal source.

22. The method of claim 19 wherein said step of signalling the store operator further includes the steps of actuating a button on the fuel dispenser.

23. The method of claim 19 wherein the step of responding to actuation of the signalling device further includes the steps of:

displaying a message on the fuel pump video screen after the customer actuates the order button and before the operator responds to said indicator;

selecting a fuel pump to respond to from among the signalling customers; and switching the video display on the selected customer's fuel pump from the external audio/visual signal providing advertising to an audio/video signal transmitting from the store operator's workstation.

24. The method of claim 23 wherein the switching step includes the step of digitally triggering one of the two analog audio/visual signals through a digitally triggered video multiplexor.

25. The method of claim 19 wherein the transmitting product order cost data step includes the steps of:

responding to the customer over the audio/visual transmission originating from the operator's workstation;

sending an audio/visual order confirmation to the customer; and providing total sale cost information to the customer located at the fuel pump.

26. The method of claim 25 wherein the step of sending an audio/visual order confirmation to the customer further includes sending a video image of the store operator.

27. The method of claim 26 wherein the step of sending an audio/visual order confirmation to the customer further includes superimposing graphic product order data on the video image of the store operator.

28. The method of claim 27 wherein the step of providing total sale cost information to the customer further includes the steps of:

transmitting the fast food product cost information from the store operator's data terminal via twisted pair wiring to the central control computer;

combining the total fuel sale cost and fast food total cost at the central control computer; and relaying the total sale cost information from the central control computer to the video display on the fuel pump.

29. An apparatus for installation in a retail setting for selling fuel and fast food products ordered by a customer interacting with an operator, comprising:

a. a fuel dispenser housing including:
  i. fuel dispensing and measuring apparatus,
  ii. a video display for displaying information to the customer,
  iii. a first microphone to capture the voice of the customer,
  iv. a first speaker to reproduce the voice of the operator,
  v. a signalling device actuable to permit the customer to signal to the operator that the customer wishes to place an order for fast food items by interfacing with an operator, and
  vi. a customer interface configured to provide a complete fuel transaction at said housing without operator intervention when fast food items are not ordered,
b. fast food ordering apparatus including:
  i. a data terminal for receiving operator-keyed data about other products ordered by a customer at said housing,
  ii. a second microphone to be positioned to capture the voice of the operator during a transaction and linked to the first speaker in the fuel dispenser,
  iii. a second speaker linked to the first microphone in the fuel dispenser to reproduce the voice of the customer during a transaction,
  iv. an indicator linked to the signalling device to indicate to the operator that the customer wishes to order other products, and
  v. a camera for taking images of the operator during fast food ordering and linked to the video display in the fuel dispenser,
c. a controller linked to the fuel dispenser and to the other product ordering apparatus to receive order information concerning other products ordered by the customer and communicate received order information to said fuel dispenser so that the customer may pay for other products as well as dispensed fuel.

30. The apparatus of claim 29 further including a video source linked to the video display to provide video images to display on said video display.

31. The apparatus of claim 30 wherein said video source is a video player.

32. The apparatus of claim 29 further comprising a video controller operatively associated with said camera and said video display adapted to mix the order information with the video images provided by said camera for display on said video display.

33. The apparatus of claim 32 wherein said video controller is located at said fuel dispenser housing.

34. The apparatus of claim 33 wherein said video controller is located at said fast food ordering apparatus.

35. The apparatus of claim 32 wherein said video controller is adapted to superimpose the order information on said video display.

36. The apparatus of claim 35 wherein said video controller is adapted to superimpose the order information on said video display line by line.

37. The apparatus of claim 33 wherein the order information displayed to the customer provides a video receipt for the customer.

38. A method of arranging for sale and payment for fuel and other products in a single transaction, comprising the steps of:

providing a card-reader equipped fuel dispenser housing having fuel dispensing and measuring apparatus, a video display for displaying information to the customer, a first microphone to capture the voice of the customer, a first speaker to reproduce the voice of the operator, a camera to provide video of a fast food operator on the video display when fast food ordering is initiated a signalling device actuable to permit the customer to signal to the operator that the customer wishes to place an order for other products, and a payment receiver for receiving payment from the customer;

authorizing credit for the customer from a central computer;

dispensing fuel through the fuel dispensing and measuring apparatus;

monitoring the cost of fuel dispensed;

displaying other advertising and promotional information provided by an external audio/visual signal source to the customer located at the fuel dispenser;

signalling a store operator from a signalling device located at the fuel dispenser when fast food ordering is desired, further including the steps of actuating a button on the fuel dispenser;

responding to actuation of the signalling device by the customer by inviting the customer to place an order for other products in the form of a presentation on the video display or reproducing the voice of an operator on the first speaker, said responding further including the steps of;
  i. displaying a message on the fuel pump video screen after the customer actuates the order button and before the operator responds to said indicator,
  ii. selecting a fuel pump to respond to from among the signalling customers, and
  iii. switching the video display on the selected customer's fuel dispenser from an external audio/video signal providing advertising to an audio/video signal transmitting from the store operator's workstation, wherein said switching includes the step of digitally triggering one of two analog audio/video signals through a video multiplexor, transmitting fast food order data requested by the customer from the first microphone to a remote product ordering location;

registering the fast food order data on an order-entry data terminal;

transmitting order cost data from the remote product ordering location to the fuel dispenser, wherein said transmitting further includes the steps of;
  i. responding to the customer over the audio/video transmission originating from the operator's workstation,
  ii. sending an audio/visual order confirmation to the customer's fuel dispenser, said sending further including the step of superimposing graphic product order information from the operator's data entry terminal on the video image of the store operator,
  iii. providing total sale cost information to the customer on the video display located at the fuel dispenser, said providing further including the steps of transmitting the fast food product cost information from the store operator's data terminal to the site controller, combining the total fuel cost and fast food cost at the site controller, and relaying the total sale cost information form the site controller to the video display on the fuel pump, receiving payment for the fuel and fast food products from the customer through the payment receiver;

printing a pick-up ticket for the customer to carry to the delivery window; and delivering the other product orders to the customer at a delivery window.

39. An apparatus for installation in a retail setting for selling fuel and other non-fuel products ordered by a customer interacting with an operator, comprising:
  a. a fuel dispenser housing including:
    i. fuel dispensing and measuring apparatus,
    ii. a video display for displaying information to the customer,
    iii. a first microphone to capture the voice of the customer,
    iv. a first speaker to reproduce the voice of the operator,
    v. a signalling device actuable to permit the customer to signal to the operator that the customer wishes to place an order for fast food products by interfacing with the operator,
    vi. a video controller linked to said video display for providing mixed video images to said video display, and
    vii. a customer interface configured to provide a complete fuel transaction at said housing without operator intervention when fast food items are not ordered,
  b. fast food ordering apparatus including:
    i. a data terminal for receiving operator-keyed data about fast food products ordered by a customer,
    ii. a second microphone to be positioned to capture the voice of the operator during a transaction and linked to the first speaker in the fuel dispenser,
    iii. a second speaker linked to the first microphone in the fuel dispenser to reproduce the voice of the customer during a transaction, and
    iv. an indicator linked to the signalling device to indicate to the operator that the customer wishes to order other products,
  c. a controller linked to the fuel dispenser and to the fast food product ordering apparatus to receive order information concerning other products ordered by the customer and communicate received order information to said fuel dispenser so that the customer may pay for other products as well as dispensed fuel, and
  d. a camera focused on the operator and linked to the video controller to provide video images to display on said video display, said video controller adapted to mix the order information with the video images to provide a video receipt with line item detail of the order, wherein said apparatus is configured to provide audio and video of the operator at the video display to place a fast food item order when said signalling device is activated in addition to carrying out a fueling transaction.

40. The apparatus of claim 39 wherein said data terminal of said fast food order apparatus is a point-of-sale terminal.

* * * * *